Aug. 12, 1947.  W. R. SCHALL, JR., ET AL  2,425,442
ANTIDISPARITY MOTOR CONTROL SYSTEM
Filed July 17, 1944  2 Sheets-Sheet 1

INVENTORS
WILLIAM R. SCHALL, Jr. &
LLOYD H. VAN DERMARK
BY

Richard A. Marsen
ATTORNEY

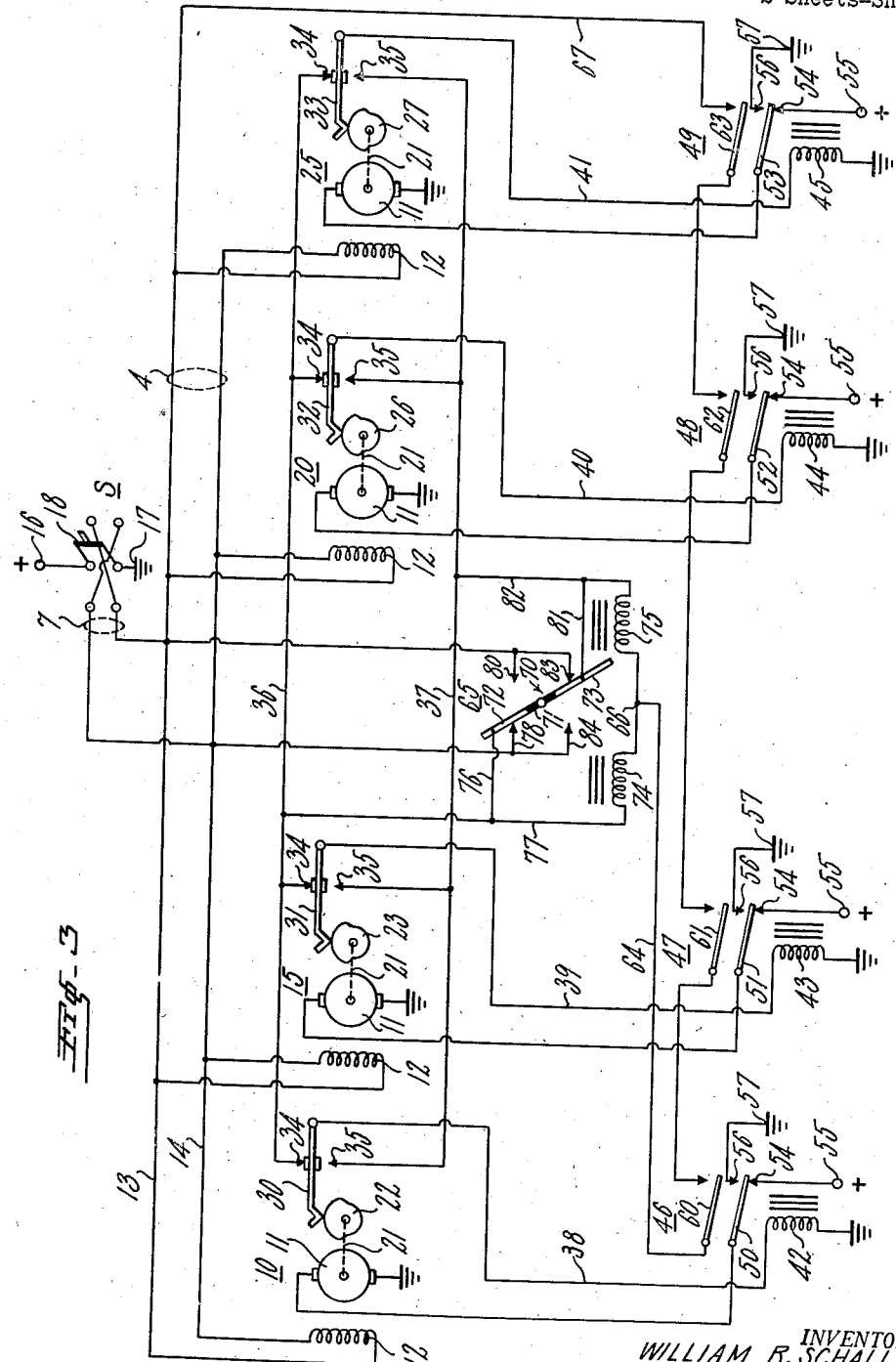

Patented Aug. 12, 1947

2,425,442

UNITED STATES PATENT OFFICE 2,425,442

ANTIDISPARITY MOTOR CONTROL SYSTEM

William R. Schall, Jr., and Lloyd H. Van Dermark, Piqua, Ohio, assignors, by mesne assignments, to Lear, Incorporated, Grand Rapids, Mich., a corporation of Illinois Application July 17, 1944, Serial No. 545,330

16 Claims. (Cl. 172—293)

This invention relates to electrical remote control systems by means of which a plurality of members may be moved in alignment with each other, and more particularly to a control system for synchronizing the operation of a plurality of members motivated by direct current motors.

The invention finds particular usefulness aboard aircraft. On larger military and commercial aircraft, various components such as landing gears, wing flaps, etc., are power operated to selected positions, the operation thereof being remotely controlled from a point adjacent the pilot's compartment. Some components, as wing flaps, are designed to operate in pairs or in groups, and it is necessary that the elements of each pair or group be kept in step with each other to preserve the aerodynamic stability of the aircraft. As a typical illustration, outboard and inboard wing flaps are sometimes provided on each wing of an airplane. The outboard wing flaps on both wings must be maintained in alignment with each other, throughout their operating range, as must be the inboard wing flaps.

Due to increased weight, inaccessibility and other readily apparent objections, it is generally not desirable to mechanically interconnect the actuators or components for synchronous movement. Accordingly, resort has been had to individually controlled actuators for each component, requiring provision for maintaining such actuators in substantial synchronous alignment at all times. Such actuators are generally driven by direct current motors, due to the superior performance characteristics of such motors, and as the power supply aboard the aircraft is generally a 28 volt battery and/or generator. The present invention provides an effective and novel system for synchronizing the operation of mechanically independent components individually operated by remotely controlled direct current motors.

The present invention also provides an electrical control system which is substantially invulnerable to gun fire. For instance, when the control system of the invention is used to control the positions of airplane wing flaps, in the event that any one or a group of the electrical connections to the several wing flaps become severed, thereby stopping one or more flaps, the other flaps will also stop before sufficient differential between the positions of the flaps has been established to produce aileron action. Such aileron action is disadvantageous in that it upsets the aerial stability of the plane. The system is effective, in the event one or more flaps become jammed, either due to icing or any other condition, to cause the other flaps to stop before a differential sufficient to produce such aileron action has been established.

It is among the objects of this invention to provide an electrical control system for maintaining a plurality of mechanically independent movable components in alignment with each other at all times; to provide such a system including individual actuators for the movable components and impulsing means periodically operable by the actuators to check the alignment of the movable components; to provide such a system including mechanism for periodically deenergizing the power means for each actuator and immediately reenergizing the same providing all actuators are in alignment; to provide such a system in which the alignment of a number of mechanically independent movable components may be maintained within any desired degree of precision; to provide an electrical control system for a plurality of movable aircraft components which is substantially invulnerable to gun fire; and to provide a relatively simple and reliable anti-disparity control system for a plurality of movable components individually operated by direct current motors.

These and other objects, advantages and novel features of the invention will be apparent from the following description and the accompanying drawings. In the drawings:

Fig. 3 is a schematic representation of the electrical and mechanical elements of the control system of the invention.

Figure 1:
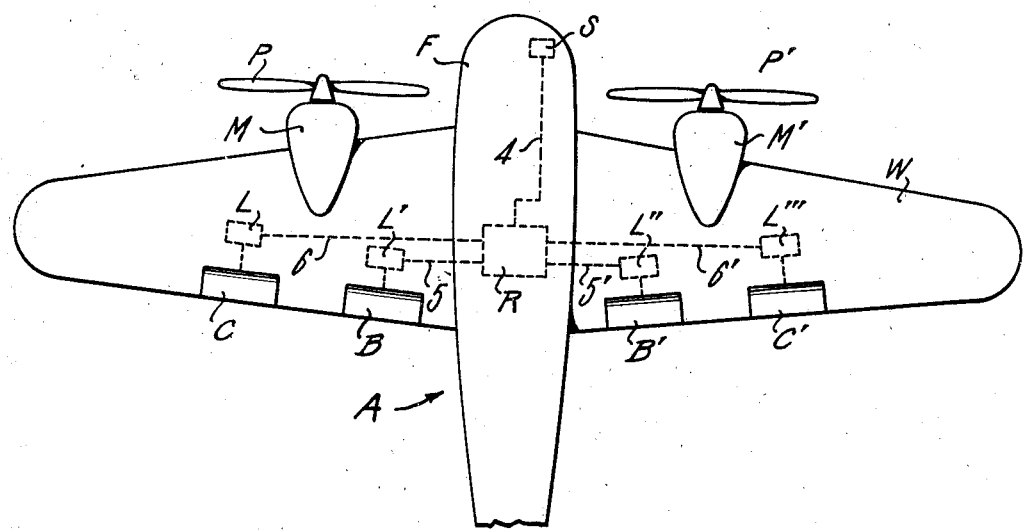
Fig. 1 is a partial plan view of an aircraft provided with inboard and outboard wing flaps, and including a flap position control system in accordance with the present invention.

Referring to Fig. 1, the control system of the invention is illustrated as used to control the position of a plurality of movable components, such as inboard wing flaps B and B' and outboard wing flaps C and C' of an aircraft A having a fuselage F and a wing structure W. Aircraft A is illustrated as a multi-motored plane having motors M and M' driving propellers P and P' respectively. The inboard and outboard wing flaps are hingedly mounted near the rear edge of the wing structure in a manner well known to those skilled in the art. In the present instance, such wing flaps are operated by motor-driven mechanical actuators L through L''' which may be of the type described and claimed in the copending application Serial No. 483,515 filed April 17, 1943, for "Unitary mechanical actuator device," assigned to the same assignee as this case. However, in the present invention the electromagnetic clutch-brake unit of said copending application is omitted and the motors are directly connected mechanically to the actuators.

The position of the wing flaps is controlled by a switch S mounted adjacent the pilot's compartment and connected by a cable 4 to control circuits contained in a relay panel R. Cables 5 and 5' electrically connect actuators L' and L'' for inboard wing flaps B and B' to relay panel R; and cables 6 and 6' electrically connect relay panel R to actuators L and L''' for outboard wing flaps C and C'.

In accordance with the present invention, the control system diagrammatically illustrated in Fig. 1, is effective to maintain the operated positions of all of the wing flaps in substantial synchronism at all times. Should one wing flap become jammed, or should the electrical connections thereto become severed, the motors operating all of the other wing flaps will be deenergized substantially immediately so that no substantial discrepancy between the angular positions of the several wing flaps can occur. This effectively prevents aileron action due to angular discrepancies between the wing flaps, which latter upsets the aerial stability of the aircraft A. The control system is substantially invulnerable to gun fire in that, if such gun fire should sever the electrical connections to one or more actuators for the wing flaps, all of the other actuators will immediately stop, preventing substantial disparity between the angular position of the several wing flaps, and thus preventing the aforementioned undesirable aileron action.

Figure 2:
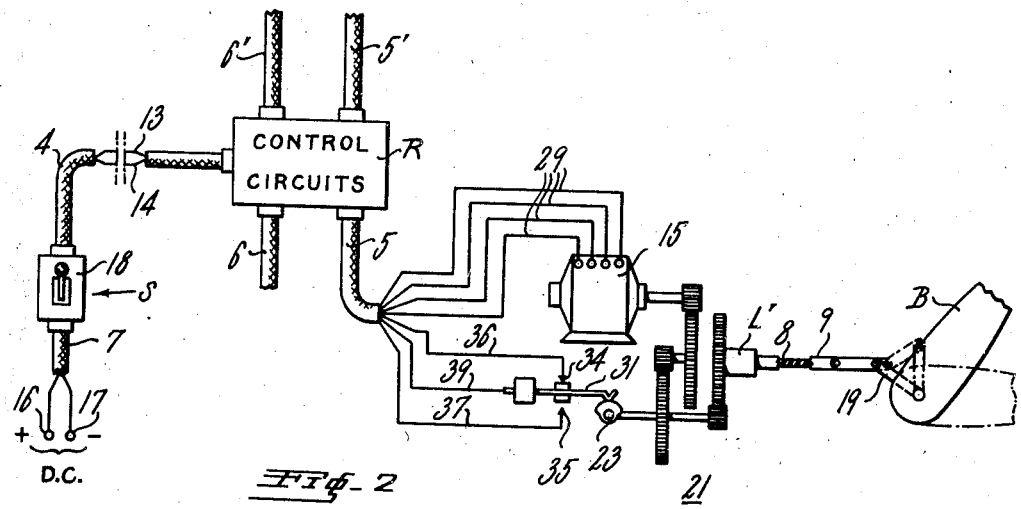
Fig. 2 is a schematic view of the control system of the invention diagrammatically illustrating the operating mechanism for one of the wing flaps.

Fig. 2 schematically illustrates the control system and mechanical operating means for one of the inboard wing flaps B. The pilot's control S comprises a suitable double pole double-throw switch 18 connected by a two conductor cable 7 to the opposite terminals 16 and 17 of a source of direct current. Such source of direct current may be the usual 28-volt aircraft battery and/or generator. The cable 4 connecting control S to relay panel R is a two conductor cable containing conductors 13 and 14. Relay panel R is connected to actuators L to L''' through cables 5, 5', 6 and 6'. The cable 5 connects relay panel R to the motor 15 operatively associated with the linear actuator L' operating inboard flap B.

Motor 15 drives actuator L' through suitable reduction gearing 21. The actuator comprises a pair of relatively rotatable threadedly engaged members such as a screw 8 and a threaded sleeve 9. Relative rotation of the screw and the sleeve effects operation of wing flap B through a crank 19.

The control system includes a two position cam 23 connected to an intermediate section of gearing 21. The relative ratio of the gearing and the point of connection of cam 23 thereto is so chosen that cam 23 will make several revolutions for each increment of movement of flap B. In a manner to be described more fully hereinafter, such arrangement provides a large number of control impulses per increment of movement of wing flap B so that the position of the flap may be controlled with any desired degree of accuracy.

Cam 23 operates switch arm 31 adapted to engage an upper contact 34 and a lower contact 35. Contact 34, contact 35 and switch arm 31 are connected to conductors 36, 37 and 39, respectively, forming part of cable 5. Cable 5 also includes four conductors indicated at 29 for connecting the field and armature windings of motor 15 to relay panel R, containing the control circuits, for selective reverse rotation of motor 15.

When the pilot operates control S as by moving switch 18 thereof, the several motors for the wing flaps are energized through suitable relay circuits contained in relay panel R. Operation of the motors, such as 15, causes the associated mechanical actuator, such as L', to vary the angular position of the wing flap connected thereto, such as flap B. During such operation, cam 23 is rapidly rotated, making a number of rotations for each incremental movement of wing flap B. Such rotation effects alternate engagement of arm 31 with contacts 34 and 35. In a manner described more fully hereinafter, such alternate engagement effects control or checking action on the positions of the several wing flaps in such a manner that, should any discrepancy in position take place, all of the motors are deenergized until such time as substantial alignment of the wing flaps is reestablished.

To simplify the drawing, in Fig. 3 only the motors of the mechanical actuators L through L''' have been schematically illustrated at 10, 15, 20 and 25, respectively. The motors are direct current motors, and each comprises an armature 11 and shunt field winding 12. Shunt wound direct current motors are preferred because of their inherently good speed characteristics. Field windings 12 are connected in parallel with each other to conductors 13 and 14, and the latter are connected to the opposite terminals 16 and 17 of the direct current source through the medium of the double-pole, double-throw reversing switch 18. As described above, the source of direct current may be the usual 28-volt aircraft battery or generator.

The gearings 21 connecting the several motors to the associated mechanical actuators are indicated by the broken lines connected to the armatures 11 of the motors. Each actuator is provided with a two position cam 22, 23, 26 and 27, driven by gearing 21, as described. Each cam is operatively engaged by a movable switch arm 30, 31, 32 and 33, each movable between the upper and lower contact points 34 and 35. Contact points 34 are interconnected by conductor 36, and contact points 35 by conductor 37. The cams are driven by the actuators, preferably through reduction gearing 21, and, with their associated switch arms, may be mounted in the control boxes forming part of the actuator units illustrated in said copending application.

The several cam switch arms are connected by conductors 38, 39, 40 and 41, respectively, to the operating coils 42 to 45 of relays 46 to 49. The opposite terminals of the coils are connected to ground as indicated.

Relays 46 to 49 individually control the energization of motor armatures 11, each relay being operatively associated with one motor armature. For this purpose, one terminal of each armature is connected to a switch arm 50 to 53, each forming part of one of the relays. These switch arms normally engage back contacts 54 which are connected to positive terminal 55 of a suitable source of direct current, which may be the same as that represented by terminal 16. When the relay coils are energized, switch arms 50 through 53 are moved into engagement with front contacts 56 which are connected to the opposite terminal of the source of current or ground, as at 57, which may be the same as negative terminal 17. It will thus be seen that, while one terminal of each of the armatures 11 is connected continuously to ground, the opposite terminal thereof may be connected either to positive terminal 55 or to negative or ground terminal 57. That is, energization of relays 46 through 49 will move switch arms 50 through 53 to deenergize motor armatures 11, and, in so doing, will shunt these armatures providing a dynamic braking circuit therefor, as fields 12 will will still be energized. This will substantially instantaneously stop motion of the associated armature 11 in the event of energization of any of the relays 46 through 49.

Each relay 46 to 49 is provided with second switch arms 60, 61, 62 and 63, which are connected in series with each other. One side of the series circuit is connected through conductor 64 to the mid point 66 of a polarized latching relay 65. The other terminal of the series circuit is connected by conductor 67 to conductor 13, forming part of cable 4 (Figs. 1 and 2), which in turn is connected through switch 18 and cable 7 to the source of direct current indicated by terminals 16 and 17.

Relay 65 includes a movable armature 70 having a central pivot portion 71 of insulating material and end portions 72 and 73 of electrically conductive material. Operating coils 74 and 75 are provided to move armature 70 between two positions. Conductive portion 72 of armature 70 is connected by conductors 76 and 77 to one terminal of coil 74 and to conductor 36. In the position shown in the drawing, portion 72 is in engagement with contact 78 connected to one terminal of switch 18. In a position opposite to that shown in the drawing, portion 72 is adapted to engage a contact 80 connected to the opposite terminal of switch 18.

Similarly, conductive portion 73 is connected through conductors 81 and 82 to one terminal of coil 75 and to conductor 37. In the position shown in the drawing, portion 73 engages a contact 83 connected, in parallel with contact 80, to one terminal of switch 18. At the opposite extreme of movement of armature 70, portion 73 is arranged to engage contact 84 connected, in parallel with contact 78, to the opposite terminal of switch 18.

The control system operates in the following manner. Assuming that switch 18 is closed in such a direction that conductor 13 is connected to positive terminal 16 and conductor 14 to negative terminal 17, under such conditions contact points 80 and 83 will be positive, and contact points 78 and 84 will be negative. In the illustrated position of armature 70, the outer terminal of coil 75 will likewise be positive, the outer terminal of coil 74 will be negative, conductor 36 and contacts 34 will be negative, and conductor 37 and contacts 35 will be positive.

In the position shown, cam means 22, 23, 26 and 27 are all aligned and switch arms 30 through 33 are in engagement with contacts 34. Accordingly, under the assumed conditions, coils 42 to 45 will be shunted and armatures 11 will be connected to positive terminals 55 through switch arms 50. When the several cams 22, 23, 26 and 27 have made a little more than a quarter revolution, switch arms 30 through 33 will engage contacts 35. Under the assumed conditions, contacts 35 are positive and therefore coils 42 through 45 will be energized. Upon energization of the coils, switch arms 50 through 53 are connected to ground at 57, shunting armatures 11.

However, switch arms 60 through 63 are simultaneously closed, completing an energizing circuit for coil 74 of relay 65 from positive terminal 18 through conductors 13 and 67, switch arms 60 through 63 in series, conductor 64, and mid-point or junction 66. Coil 75 is shunted by the same circuit, both coil terminals being connected to positive battery. Switch arm 70 of relay 65 will be immediately swung in a clockwise direction under the influence of coil 74. This will reverse the polarity of conductors 36 and 37, and thus of contacts 34 and 35, as conductive portion 72 will now be positive and conductive portion 73 will be negative. Accordingly, with contact points 35 negative, coils 42 through 45 will be shunted, and switch arms 50 through 53 and 60 through 63 will resume the position shown in the drawing, thus immediately reenergizing motor armatures 11. Such action takes place twice during each revolution of cams 22, 23, 26 and 27.

If the actuator powered by motor 10 is out of synchronism with the other actuators, being, for the purpose of illustration, in advance of the others, upon cam 22 moving to a position displaced a little more than 90° from that illustrated, coil 42 would be energized to shunt motor armature 11. Motor 10 would be stopped substantially instantaneously due to the dynamic braking action effected by the continued energization of its shunt field 12 and the shunting of its armature 11. Motor armature 11 would not be reconnected to positive terminal 55 until such time as each of the actuators powered by the other motors 15, 20 and 25 had moved their cams to a position to energize their coils 43, 44 and 45, and close switches 61, 62 and 63. Switches 60 through 63 are closed, as will now be understood, only when the cams, and thus the actuators and motors, are in absolute alignment.

In the event one of the motors jams, due to icing or other conditions affecting the wing flap operated thereby, or in the event the electrical connections to such motor are severed, as by gun fire, the other motors will stop before any substantial disparity between the relative positions of the several flaps has occurred. For instance, if motor 10 should stop with cam 22 in the position shown in the drawings, the other motors would continue to rotate only until such time as their associated cams attain a position where the switch arms associated therewith are engaged with contact points 35. The other motors would then immediately stop, due to the dynamic braking action effected by the shunting of the motor armatures with the shunt fields remaining energized. At such point, relays 43, 44 and 45 associated with such other motors will be energized to move their armatures into an upper position. However, as the armatures of relay 42 remain in the lower position, no closure of the circuit for energizing relay 65 to reverse the position of its armature 70 would be possible, as such circuit could be open at the armature 60. Accordingly, the other motors would not be again energized. Should the condition causing the stopping of motor 10 be cured, this motor would again be energized and continue to rotate. When cam 22 has been rotated to a position where arm 30 engages contact 35, the other motors 15, 20 and 25 would again become energized and operate in synchronism with motor 10 in the same manner as previously described.

The described system is effective to maintain the position of movable components, such as wing flaps B, B', C and C' driven by motors 10, 15, 20 and 25, respectively through actuators L to L''', respectively, in alignment to substantially any degree of accuracy required. For instance, should it be required that the wing flaps remain aligned within one degree; and that if one flap stops the others will be stopped before establishing a misalignment greater than five degrees, such control can be accomplished by achieving the proper speed ratio between the corrector cams 22, 23, 26 and 27, and the angular movement of the wing flaps. In a typical instance, the ratio of the corrector cam travel to the angular movement of the wing flap associated therewith was selected, through suitable choice of the gearing ratio of reduction gearing 21, to be 103 to 1. Since there are two corrections per cam revolution, the correction ratio of the cam with respect to the angular movement of the flap was 206 to 1. The flap travel for each cam correction may be derived by dividing 360 degrees by 206, attaining a figure of 1.75 degrees. Therefore, the maximum any flap can travel when one or more flaps stop is 1.75 degrees.

The prevention of more than one degree misalignment between the flaps while operating, is provided by selective shunt motors having inherently good characteristics. If it were assumed that the ratio of no load speed to full load speed were two to one, the flaps would operate under the above conditions with a maximum misalignment of .875 degree. This is within the above requirement of less than one degree misalignment when operating and holds true for all cases, since once a shunt motor is loaded beyond a given point, it stalls, and the requirements or misalignment revert to the five degree figure for stalling of one or more flaps as mentioned above. In a typical practical installation of the present invention, however, the no load speed of the motors was 15,600 R. P. M. and the full load speed 14,000 R. P. M. This gives a possible speed ratio of 1.11 to 1, and accordingly results in a maximum misalignment of only 0.173 degree. It should be understood that the above figures are given only as an illustration of one practical embodiment of the invention. Control within any degree desired can be accomplished by choosing a proper speed ratio between the movable component, such as the airplane wing flap, and the correction cam geared thereto. It is desirable that the correction cam should be so geared to the motor and to the movable component that the cam will make a considerably smaller number of revolutions per minute than will the motor armature shaft. Furthermore, the cam must travel at a sufficiently faster rate than the movable component to give the desired number of impulses per unit of movement of the component to achieve control thereof within the desired limits of accuracy.

While the system has been illustrated as applied to control for wing flaps of an airplane, it will be obvious from the drawings and the description that the system could be used to maintain alignment of any desired number of movable components. The system is thus characterized by great flexibility and adaptability to widely varying conditions.

While a specific embodiment of the invention has been shown and described to illustrate the application of the principles thereof, it will be obvious that the invention may be otherwise embodied without departing from such principles.

What is claimed is:

1. A control system for driving a plurality of members in alignment comprising, in combination, a plurality of direct current motors normally electrically connected to a source of direct current and each mechanically connected to one member to move the same; impulsing means operated by each motor and each effective to periodically interrupt the energization of its associated motor; and switch means operable cooperatively by all of said impulsing means when in alignment to immediately reenergize said motors.

2. A control system for driving a plurality of members in alignment comprising, in combination, a plurality of direct current motors normally electrically connected to a source of direct current and each mechanically connected to one member to move the same; cam means operated by each motor and each effective to periodically interrupt the energization of its associated motor; and switch means operable cooperatively by all of said cam means when in alignment to immediately reenergize said motors.

3. A control system for driving a plurality of members in alignment comprising, in combination, a plurality of direct current motors; switch means normally electrically connecting each motor to a source of direct current; means mechanically connecting each motor to move one of said members; impulsing means operable by each motor; relay means periodically operable by said impulsing means to open said switch means; and means operable cooperatively by all of said relay means when said impulsing means are in synchronism to reclose said switch means.

4. A control system for driving a plurality of members in alignment comprising, in combination, a plurality of direct current motors; switch means normally electrically connecting each motor to a source of direct current; means mechanically connecting each motor to move one of said members; a cam operated switch operable by each motor; relay means periodically operable by said cam operated switch to open said switch means; and means operable cooperatively by all of said relay means when said cam operated switches are in synchronism to reclose said switch means.

5. A control system for driving a plurality of members in alignment comprising, in combination, a plurality of direct current motors; switch means normally electrically connecting each motor to a source of direct current; means mechanically connecting each motor to move one of said members; impulsing means operable by each motor; relay means periodically operable by said impulsing means to open said switch means; and means operable by said relay means when said impulsing means are in synchronism to reclose said switch means; said last-named means including a relay, a second normally open switch means operatively associated with each relay means and closed when said first-named switch means is open, and circuit means connecting said second switch means in series with each other and with said relay and the source of current.

6. A control system for driving a plurality of members in alignment comprising, in combination, a plurality of direct current motors; switch means normally electrically connecting each motor to a source of direct current; means mechanically connecting each motor to move one of said members; a cam operated switch operable by each motor; relay means periodically operable by said cam operated switch to open said switch means; and means operable by said relay means when said cam operated switches are in synchronism to reclose said switch means; said last-named means including a relay, a second normally open switch means operatively associated with each relay means and closed when said first-named switch means is open, and circuit means connecting said second switch means in series with each other and with said relay and the source of current.

7. A control system for driving a plurality of members in alignment comprising, in combination, a plurality of direct current motors; first normally closed switch means electrically connecting each motor to a source of direct current; means mechanically connecting each motor to move one of said members; second normally open switch means operatively associated with said first switch means; impulsing means operable by each motor; relay means periodically operable by said impulsing means to open said first switch means and close said second switch means; a relay, said relay, when energized, deenergizing said relay means to reclose said first switch means and reopen said second switch means; and circuit means connecting said second switch means in series with each other and with said relay and the source of current, all of said second switch means being closed when said impulsing means are in synchronism.

8. A control system for driving a plurality of members in alignment comprising, in combination, a plurality of direct current motors; first normally closed switch means electrically connecting each motor to a source of direct current; means mechanically connecting each motor to move one of said members; second normally open switch means operatively associated with said first switch means; a cam operated switch operable by each motor; relay means periodically operable by said cam operated switch to open said first switch means and close said second switch means; a relay, said relay, when energized, reenergizing said relay means to reclose said first switch means and reopen said second switch means; and circuit means connecting said second switch means in series with each other and with said relay and the source of current, all of said second switch means being closed when said impulsing means are in synchronism.

9. A control system for driving a plurality of members in alignment comprising, in combination, a plurality of direct current motors each having one terminal electrically connected to one terminal of a source of direct current; means mechanically connecting each motor to move one of said members; pairs of contacts each operatively associated with one of said motors; a movable switch arm operatively associated with each pair of contacts; cam means operable by each motor and each associated with one of said switch arms to alternately engage the same with the contacts of the pair associated therewith; switch means normally electrically connecting each motor to the opposite terminal of the source of current; coil means connected in series circuit relation with each switch arm and energized, upon a reversal in position of said switch arm, to operate said switch means to shunt its associated motor; a relay operative when energized to reverse the relative polarity of the contacts of each pair to deenergize said coil means; and means operable by said coil means when said cams are in alignment to energize said relay.

10. A control system for driving a plurality of members in alignment comprising, in combination, a plurality of direct current motors each having one terminal electrically connected to one terminal of a source of direct current; means mechanically connecting each motor to move one of said members; pairs of contacts each operatively associated with one of said motors; a movable switch arm operatively associated with each pair of contacts; cam means operable by each motor and each associated with one of said switch arms to alternately engage the same with the contacts of the pair associated therewith; first switch means normally electrically connecting each motor to the opposite terminal of the source of current; second switch means each operatively connected to one of said first switch means; coil means connected in series circuit relation with each switch arm and energized, upon a reversal in position of said first switch arm, to operate said first switch means to shunt its associated motor and to close said second switch means; a relay operative when energized to reverse the relative polarity of the contacts of each pair to deenergize said coil means; and circuit means connecting said second switch means in series with each other and with said relay and the source of current.

11. A control system for driving a plurality of members in alignment comprising, in combination, a plurality of direct current motors each having one terminal electrically connected to one terminal of a source of direct current; means mechanically connecting each motor to move one of said members; a plurality of normally deenergized relay means each electrically connecting the other terminal of one motor to the opposite terminal of the source of current; said relay means each including an operating coil having one terminal connected to one terminal of the source of current; said relay means, when energized, each shunting its associated motor; a cam operated switch operable by each motor; each cam operated switch including a switch arm connected to the other terminal of one of said coils and a pair of contacts; circuit means connecting corresponding contacts of each pair in series circuit relation; a normally deenergized relay connecting such series of contacts to opposite terminals of the source of current; said switch arms alternately engaging said contacts to alternately energize and shunt each relay means operating coil; said relay being operative when energized to reverse the relative polarity of the contacts of each pair; and means operable by said relay means when all of said cam operated switches are in alignment to energize said relay.

12. A system for operating a plurality of independently actuated movable elements in alignment comprising, in combination, a mechanical actuator operative to position each of said elements; a direct current electric motor operatively connected to each actuator; switch means normally connecting each motor to a source of direct current; and impulsing means operable by each actuator and each operatively associated with one of said switch means, each impulsing means operating said switch means upon misalignment of its associated movable elements to deenergize the motor controlled by said switch means.

13. A system for operating a plurality of independently actuated movable elements in alignment comprising, in combination, a mechanical actuator operative to position each of said elements; a direct current electric motor operatively connected to each actuator; switch means normally connecting each motor to a source of direct current; and cam means operable by each actuator and each operatively associated with one of said switch means, each cam means operating said switch means upon misalignment of its associated movable elements to deenergize the motor controlled by said switch means.

14. A system for operating a plurality of independently actuated movable elements in alignment comprising, in combination, a mechanical actuator operative to position each of said elements; a direct current electric motor operatively connected to each actuator; switch means normally connecting each motor to a source of direct current; impulsing means operable by each actuator and each operatively associated with one of said switch means, each impulsing means operating said switch means upon misalignment of its associated movable elements to deenergize the motor controlled by said switch means; and means operable by each switch means when said elements are realigned to reenergize its associated motor.

15. A system for operating a plurality of independently actuated movable elements in alignment comprising, in combination, a mechanical actuator operative to position each of said elements; a direct current electric motor operatively connected to each actuator; switch means normally connecting each motor to a source of direct current; cam means operable by each actuator and each operatively associated with one of said switch means, each cam means operating said switch means upon misalignment of its associated movable elements to deenergize the motor controlled by said switch means; and means operable by each switch means when said elements are realigned to reenergize its associated motor.

16. A control system for driving a plurality of members in alignment comprising, in combination, a plurality of direct current shunt wound motors each having one armature terminal electrically connected to one terminal of a source of direct current, the field windings of said motors being electrically connected across the source of current; means mechanically connecting each motor to move one of said members; a plurality of relay means each operatively associated with one of said motors, each relay means including a normally deenergized operating coil, a first switch arm normally electrically connecting the other terminal of the associated motor to the other terminal of the source of current and a second switch arm open when said coil is deenergized; a cam operated switch operable by each motor, each cam operated switch including a switch arm connected to the other terminal of one of said coils, a pair of contacts and cam means operable by each motor and each associated with one of said arms to alternately engage the same with the contacts of the pair associated therewith; a relay; and circuit means connecting said second switch arms in series with each other and with said relay and the source of current; said relay including switch means operably connecting opposite sets of said cam operated switch contacts to opposite terminals of said source of current and coil means operable upon closure of all of said second switch arms to operate said switch means to reverse the polarity of said sets of contacts.

WILLIAM R. SCHALL, Jr.
LLOYD H. VAN DERMARK.

REFERENCES CITED

The following references are of record in the file of this patent:

UNITED STATES PATENTS

| Number | Name | Date |
| --- | --- | --- |
| 2,239,101 | Jeffers | Apr. 22, 1941 |

Certificate of Correction

Patent No. 2,425,442. August 12, 1947.

WILLIAM R. SCHALL, Jr., ET AL.

It is hereby certified that error appears in the printed specification of the above numbered patent requiring correction as follows: Column 9, lines 46 and 47, claim 8, for "reenergizing" read *deenergizing*; and that the said Letters Patent should be read with this correction therein that the same may conform to the record of the case in the Patent Office.

Signed and sealed this 16th day of December, A. D. 1947.

[SEAL]

THOMAS F. MURPHY,
*Assistant Commissioner of Patents.*